(12) United States Patent
Zakowski

(10) Patent No.: US 9,320,391 B2
(45) Date of Patent: Apr. 26, 2016

(54) FOOD PROCESSOR BLADE ASSEMBLY

(71) Applicant: Joseph W. Zakowski, New Canann, CT (US)

(72) Inventor: Joseph W. Zakowski, New Canann, CT (US)

(73) Assignee: CONAIR CORPORATION, Stamford, CT (US)

(*) Notice: Subject to any disclaimer, the term of this patent is extended or adjusted under 35 U.S.C. 154(b) by 0 days.

(21) Appl. No.: 14/246,168

(22) Filed: Apr. 7, 2014

(65) Prior Publication Data

US 2014/0299695 A1    Oct. 9, 2014

Related U.S. Application Data

(60) Provisional application No. 61/809,484, filed on Apr. 8, 2013.

(51) Int. Cl.
*A47J 43/07* (2006.01)
*A47J 43/046* (2006.01)

(52) U.S. Cl.
CPC ............ *A47J 43/0722* (2013.01); *A47J 43/046* (2013.01); *A47J 43/0716* (2013.01)

(58) Field of Classification Search
CPC . A47J 43/0711; A47J 43/0722; A47J 43/046; A47J 43/0716; B02C 18/20; B02C 18/12; B02C 2/04; B02C 2/00
USPC .................................... 241/282.1, 282.2, 286
See application file for complete search history.

(56) References Cited

U.S. PATENT DOCUMENTS

| | | | |
|---|---|---|---|
| 4,872,764 A * | 10/1989 | McClean | 366/251 |
| 7,070,133 B1 * | 7/2006 | Harlow | 241/30 |
| 2002/0047060 A1 * | 4/2002 | Juriga | 241/92 |
| 2003/0226923 A1 * | 12/2003 | Starr et al. | 241/282.1 |
| 2004/0056130 A1 * | 3/2004 | Gursel | 241/282.1 |
| 2005/0178863 A1 * | 8/2005 | Carnevale et al. | 241/36 |
| 2007/0215735 A1 * | 9/2007 | Mulle | 241/282.1 |
| 2011/0265665 A1 * | 11/2011 | Goncalves et al. | 99/538 |

* cited by examiner

*Primary Examiner* — Faye Francis
*Assistant Examiner* — Onekki Jolly
(74) *Attorney, Agent, or Firm* — Grogan, Tuccillo & Vanderleeden, LLP

(57) ABSTRACT

A blade assembly for a food processor is provided. The blade assembly includes a body, a top knob slidably movable relative to the body, and a pair of processing blades pivotally connected to the body. The knob is movable from a first position, in which the blade assembly is locked to the bowl of the food processor and the blades are extended from the body, to a second position, in which the blade assembly is unlocked from the bowl and the blades are folded up against the body.

8 Claims, 2 Drawing Sheets

FOOD PROCESSOR BLADE ASSEMBLY

CROSS-REFERENCE TO RELATED APPLICATIONS

This application claims the benefit of U.S. Provisional Application Ser. No. 61/809,484, filed on Apr. 8, 2013, which is herein incorporated by reference in its entirety.

FIELD OF THE INVENTION

The present invention relates to food processors and, more particularly, to a food processor blade assembly.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and increased functionality.

SUMMARY OF THE INVENTION

It is an object of the present invention to provide a food processor having a blade assembly.

It is another object of the present invention to provide a blade assembly for a food processor that include a means for securely locking the blade to a work bowl of the food processor.

It is another object of the present invention to provide a blade assembly for a food processor having fold up blades.

These and other objects are achieved by the present invention.

According to an embodiment of the present invention, a blade assembly for a food processor is provided. The blade assembly includes a body, a top knob slidably movable relative to the body, and a pair of processing blades pivotally connected to the body. The knob is movable from a first position, in which the blade assembly is locked to the bowl of the food processor and the blades are extended from the body, to a second position, in which the blade assembly is unlocked from the bowl and the blades are folded up against the body.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
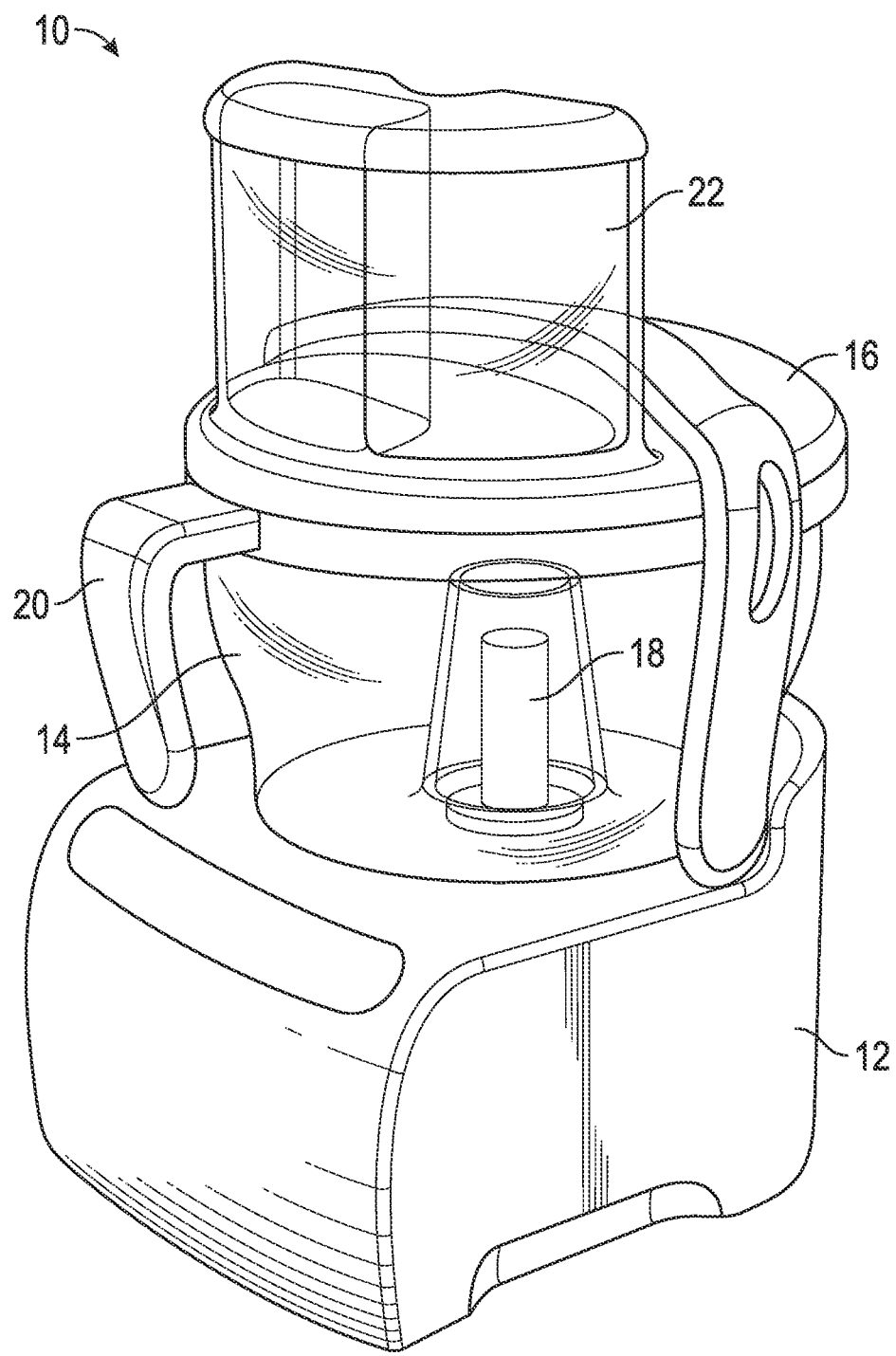
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
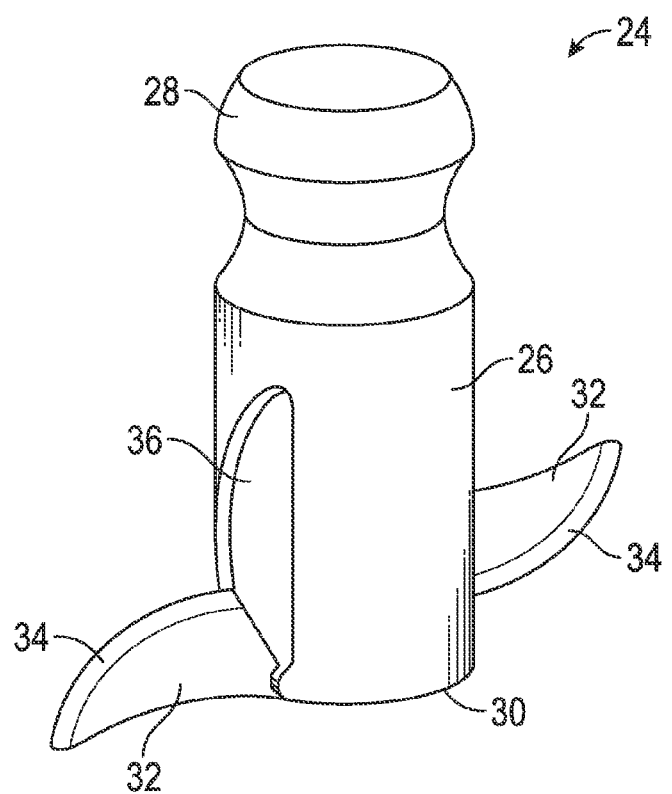
FIG. 2 is a perspective view of a blade assembly of a food processor according to an embodiment of the present invention, illustrating blades of the blade assembly in an extended and locked position.
Figure 3:
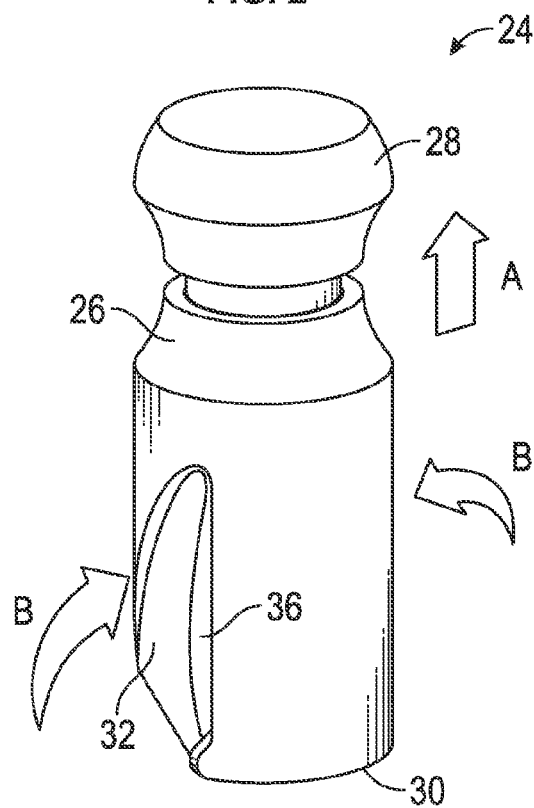
FIG. 3 is a perspective view of the blade assembly of FIG. 2, illustrating blades of the blade assembly in a folded and unlocked position.

Turning now to FIGS. 2 and 3, a blade assembly 24 for use with the food processor 10 is shown. The blade assembly 24 includes a body 26 having a top, closed end or knob 28 slidably movable relative to the body 26, a bottom end 30 formed with an opening (not shown) at its end, and an interior chamber (not shown). A pair of opposed blades 32 having cutting edges 34 are pivotally connected to the body 26. The blade assembly 24 is adapted to engage the shaft 18 of the motor in order to transmit torque therefrom in order to rotationally drive the blade assembly 24. As shown therein, the body 26 is formed with recesses 36 to accommodate the blades 32 when they are folded against the body 26, as discussed in detail hereinafter.

In operation, the blade assembly 24 may be positioned on the output shaft 18 extending though the bottom of a food processor work bowl 14. The top end 28 of the blade assembly 24 may then be pushed down, into contact with the body 26, to securely lock the blade assembly 24 to the work bowl 14 or driven shaft 18. When the top knob 28 is in the 'down' position, the blades 32 are in an extended, food processing position, as shown in FIG. 2. As shown in FIG. 3, the top knob 28 may be pulled up, in the direction of arrow A, to unlock the blade assembly 24 from the bowl. As shown therein, moving the knob 28 to the 'up' position, causes the blades 32 to fold up against the body 26, in the direction of arrows B, and nest within the recesses 36 formed in the body 26.

When a user desires to utilize the blade assembly 24 for food processing, a user simply inserts the blade assembly 24 onto the shaft 18 within the work bowl and pushes the knob 28 downward to lock the blade assembly 24 to the bowl 14 and/or shaft 18. This also causes the blades 32 to pivotally fold down and out of the recesses 36 to their extended, food processing positions.

As will be readily appreciated, containing the blades 32 within the recesses 36 in the body 26 of the blade assembly 24 when the blade assembly 24 is not within the work bowl increases safety. In particular, by folding the blades 32 against the body 26 during transport or the like (i.e., any time when not in use), blade exposure is thereby limited. Importantly, the recesses 36 also include a gap cut into the body 26 near the trailing edge of the blades 32 to ease and encourage dishwasher cleaning.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
   a base;
   a motor disposed within said base;
   an output shaft operatively connected to said motor and extending outwardly from said base, said output shaft being rotatable upon actuation of said motor;
   a work bowl received on said base; and
   a blade assembly received on said output shaft, said blade assembly including a body, at least one blade pivotally connected to said body, and a knob coupled to said body;
   wherein said knob is slidably movable relative to said body between a first position in which said knob is in close association with said body, and a second position in which said knob is spaced from said body; and
   wherein movement of said knob from one of said first position and said second position to the other of said first position and said second position causes said at least one blade to fold upwards from an extended position to a folded position against said body.

2. The food processor of claim 1, wherein:
   said at least one blade is a pair of opposed blades.

3. The food processor of claim 2, wherein:
   said body includes a pair of opposed recesses sized and shaped to fully accommodate said pair of opposed blades therein.

4. The food processor of claim 3, wherein:
   when said knob is in said first position said blades are in said extended position in which they extend radially outward from said body portion; and
   when said knob is in said second position said blades are in said folded position within said recesses of said body.

5. The food processor of claim 4, wherein:
   said knob is operatively connected to said blades and is configured to cause said blades to transition from said folded position to said extended position when said knob is moved to said first position from said second position.

6. The food processor of claim 5, wherein:
   said knob is configured to lock said blade assembly to one of said work bowl and said output shaft when said knob is in said first position; and
   when said knob is in said second position, said blade assembly is removable from said output shaft.

7. The food processor of claim 1, wherein:
   said blade assembly includes an opening at a bottom end of said body and an interior chamber in communication with said opening.

8. The food processor of claim 1, wherein:
   said blade is arcuate in shape and has a cutting edge formed on a leading edge of said blade.

\* \* \* \* \*